US007219084B1

(12) United States Patent
Gettwart et al.

(10) Patent No.: US 7,219,084 B1
(45) Date of Patent: May 15, 2007

(54) METHOD FOR PROCESSING POSTAL MATTER AND POSTAL MATTER PROCESSING SYSTEM

(75) Inventors: Klaus Gettwart, Velten (DE); Henning Hentschel, Garbsen (DE); Hartmut Neumann, Erzhausen (DE)

(73) Assignee: Francotyp-Postalia AG & Co., Birkenwerder (DE)

( * ) Notice: Subject to any disclaimer, the term of this patent is extended or adjusted under 35 U.S.C. 154(b) by 1257 days.

(21) Appl. No.: 09/586,481

(22) Filed: Jun. 1, 2000

(30) Foreign Application Priority Data

Jun. 1, 1999 (DE) ................................ 199 25 194

(51) Int. Cl.
*G06Q 40/00* (2006.01)

(52) U.S. Cl. ...................... 705/401; 705/405; 705/406; 705/408; 705/403; 177/25; 177/2

(58) Field of Classification Search ................. 177/25, 177/2; 349/9; 232/27; 705/403, 401, 8, 705/410, 406, 408; 700/219, 227
See application file for complete search history.

(56) References Cited

U.S. PATENT DOCUMENTS

| | | | | |
|---|---|---|---|---|
| 4,511,793 | A | 4/1985 | Racanelli | |
| 4,797,832 | A * | 1/1989 | Axelrod et al. | 700/227 |
| 4,923,022 | A | 5/1990 | Hsieh | |
| 4,947,333 | A | 8/1990 | Sansone et al. | |
| 5,065,000 | A | 11/1991 | Pusic | |
| 5,068,797 | A | 11/1991 | Sansone et al. | |
| 5,293,030 | A | 3/1994 | Dietrich et al. | |
| 5,388,049 | A | 2/1995 | Sansone et al. | |
| 5,477,462 | A | 12/1995 | McClung | |
| 5,539,190 | A | 7/1996 | Manduley | |
| 5,602,742 | A | 2/1997 | Solondz et al. | |

FOREIGN PATENT DOCUMENTS

| | | |
|---|---|---|
| DE | 24 30 413 | 1/1976 |
| DE | 28 19 872 | 11/1978 |
| DE | 196 17 586 | 11/1997 |
| EP | 0 911 767 | 4/1999 |
| EP | 0 866 427 A3 | 9/2000 |
| GB | 2 274 622 | 3/1994 |

OTHER PUBLICATIONS

"Embossable Credit Card in Continuous Self Mailer Form." IBM Technical Disclosure Bulletin, Jan. 1967, (NN67011024).*
"Mail Boxes Etc. and USPS develop pilot program", Office Systems, Nov. 1998, 15, 11; ABI/INFORM Global p. 8.*

* cited by examiner

*Primary Examiner*—Frantzy Poinvil
*Assistant Examiner*—Debra F. Charles
(74) *Attorney, Agent, or Firm*—Schiff Hardin LLP

(57) ABSTRACT

In a system and a method for postal matter processing, with automatic reception of postal matter in receiving stations and with a staggered postal matter processing, acquisition of shipping data and providing the postal matter with a machine-readable marking and storage of the mail take place in the receiving stations. The marked postal matter is transported to a remote distributing station having at least one franking means at which transfer of the shipping data allocated to the marking into a memory of the franking means ensues. The postal matter is franked in the distributing station according to the data that are stored in the memory allocated to the marking.

17 Claims, 6 Drawing Sheets

METHOD FOR PROCESSING POSTAL MATTER AND POSTAL MATTER PROCESSING SYSTEM

BACKGROUND OF THE INVENTION

1. Field of the Invention

The present invention is directed to a method for processing postal matter and a postal matter processing system which allow staggered postal matter processing and are suited for use with multiple carriers.

2. Description of the Prior Art

Public, automatic franking units are already known wherein a weighing device is combined with a franking device (German OS 28 19 872). Such systems, however, do not yet have a multi-carrier capability. Mail to be sent abroad is already transported by at least two respective national public mail carriers. Future mail delivery will also be handled by private carriers who may potentially use their own logos and rather different regulations for franking than the public carriers. It is specifically private carriers who, will only be present locally in the establishment phase, and who will have to collaborate with public mail carriers.

An automatic unit for franking mail and also printing out documentation thereof is disclosed in German OS 24 30 413. U.S. Pat. No. 5,065,000, for example, also discloses that two printers be utilized for a direct printing of a bar code on the postal matter and a separate printing of a record thereof. U.S. Pat. No. 4,923,022 discloses an automatic postal device with a slot for postal items, a drive mechanism, weighing, stamping and sorting mechanism. Such postal devices require a large amount of floor space for the many containers for sorted mail and are complicated and expensive to operate. One of the containers is always full first, which then negatively influences the work of the entire postal device. When, however, the postal devices are emptied in short cycles, then the containers with sorted mail are filled to different degrees and must also be individually emptied although one container is nearly empty. The transport costs are proportional to the transport distance and inversely proportional to the quantity of mail. The sorted mail must, of course, be separately transported, which requires additional attention and exertions on the part of the carrier company. If some carriers make higher demands on the franking stamp imprint in the future, for example a security imprint with 2-D bar code, high-grade printers that are expensive to maintain must be utilized.

An automatic postal matter receiving system is disclosed in European Application 503 311 with a money card or customer card and with a standardized postal matter delivery with a transport stage that does not include either a device for weighing or for franking. The money card allows an immediate debiting of a postage fee that is derived on the basis of the selection of the standardized postal matter delivery. The postage calculation does not take the weight into consideration. The transport stage is unlocked after the postage calculation. The employment of separate storage containers is also necessary since a distinction between shipping types is no longer subsequently possible due to the absence of a franking imprint. A conventional postage fee memory in combination with a secured postal matter storage container is required in combination with the card reading unit. The container is emptied by an authorized person, who loads the data from the postage fee memory into a specific removal chip card. When the sender has been authorized with a specific customer card when the postal matter is received, the card allows the customer account to be charged with the incurred fees in a central accounting location.

The remaining method up to the distribution of the unfranked mail is not disclosed in European Application 503 311, however, it can be assumed that the carrier also undertakes the mail distribution. If a public carrier were engaged for the further transport and for the distribution of postal matters, then the stipulations of this carrier for identifying or franking mail as well as for debiting would have to be adhered to. Since, however, no franking ensues, the stipulations of, for example, the Deutsche Post AG (or the USPS) are not adhered to. As a rule, postal matter, for example letters to be sent abroad, must at least be stamped with an imprint. The elimination of a franking imprint harbors further disadvantages such as problems of data documentation, a risk of fraud due to the introduction of a plurality of unpaid or overweight pieces of mail, particularly given the standard delivery of large-format postal matter.

SUMMARY OF THE INVENTION

An object of the present invention is to provide a postal matter processing method and system wherein the deficiencies of the prior art are avoided and which allow secure and economical postal matter processing, and wherein the receiving stations are emptied in a short cycle without maintenance thereof and without a separate handling of the mail in the distributing stations having to ensue with the same frequency as the emptying of the receiving stations.

The above object is achieved in accordance with the principles of the present invention in a method and a system for postal matter processing, wherein a number of automatic postal matter receiving stations are provided at which a customer can deposit unfranked letters and enter shipping data, and the receiving station prints a machine-readable marking on the deposited letters representing the entered shipping data. The deposited letters are temporarily stored at each receiving station, and are subsequently transported by a first postal carrier to a distributing station which is remote from the receiving station. At least one franking apparatus is present at the distributing station, and the shipping data, at the distributing station, are transferred into a memory of the franking apparatus, and the postal matter is franked at the distributing station according to the shipping data stored in the memory allocated to the marking. The franked postal matter is then supplied to a mail distribution center of a second postal carrier, such as governmental postal carrier.

The inventive method requires minimal outlay in the mail processing since the first carrier merely assigns an identification number per piece of mail (for example, letter) that is applied or attached as a machine-readable mark in a predetermined area at the postal matter. The aforementioned identification number is allocated to the shipping data input by the postal customer. These data are initially stored in a memory module of the receiving station and are then loaded into a memory module of the distributing station. A specific carrier card serves as transmission medium, the first carrier transporting this card to the distributing station together with the received postal matter. The marking on the postal matter is scanned in the distributing station in order to correspondingly undertake the franking.

It has been found that a common storage container for unfranked but marked mail is more likely to be filled to such an extent that the steps for emptying this container are optimum, even though the filling ensues in a short cycle. The invention therefore assumes that a common storage container for all unfranked postal matter is most beneficial for the mail dispatcher. Compared to the aforementioned solution of European Application 503 311, the invention has the advantage that the mail delivery when receiving mail is not standardized for a specific postal format. The transport stage can be unlocked independently of the postage calculation, so that the dispatcher can deposit all unfranked postal matter through a slot onto a lower guide plate of feeder arrangement. Because the mail feed is not standardized and a printer is utilized for marking the pieces of mail to be separated, attempted fraud is suppressed. The documentation of the mail deposit is also enabled by an additional document printer. A scale can be integrated in the common storage container, so that later weighing is eliminated. Differing from known systems a printer no longer need be arranged following the scale. This yields a simple structural format for the receiving stations. Alternatively, a scale can be integrated into the distributing station. The scale in the receiving station is then eliminated. In any case, the mail processing according to the invention ensues staggered such that a marking ensues before the weighing. It is advantageous that the receiving stations need only be equipped with marking printers but not with expensive franking printers. Advantageously, the stamping of the postal matter to be transported according to the rate schedule of the second carrier can ensue separately from receiving the postal matter. For a first carrier, this has the advantage of being able to negotiate a quantity discount with a second carrier for the service of delivering franked postal matter. The first carrier also can negotiate a quantity discount with further mail carriers. The franking device of the distributing station can be set for a number of different carriers. Supplying these carriers requires a deposit system in the distributing station with a controllable shunt and a number of deposits, respectively allocated to different carriers. The franking device of the distributing station is programmed to determine the carrier with the most favorable rate schedule for each carrier job. Whereas the first carrier profits from the differences in rates, supplying different carriers has the advantage for the mail shipper that the rates remain moderate as a result of competition. This, however, is not meant to preclude that the additional input of a carrier requested by the shipper being taken into consideration on the basis of a suitable user interface with keyboard and display unit in the receiving station.

It is thus inventively provided that a feeder arrangement and a marking printer are arranged in the receiving station in the direction of the mail stream preceding a storage container, and being connected to a control unit. The feeder arrangement includes a closure mechanism with a slot that can be driven by a read/write unit, so that the sender can insert at least one piece of mail through the slot into the feeder arrangement only when the sender has inserted a card into a slot of the read/write unit. A non-volatile memory for accounting data and a clock/date module are connected to the control unit, which is programmed to assign an identification number to each piece of mail and, dependent on the shipping inputs actuated via the keyboard, to make an entry in the non-volatile memory for accounting data under the aforementioned number, as well as to store the weight, if desired, and to drive the marking printer to print the aforementioned number onto the piece of mail while it is being transported downstream.

Given a specific carrier card introduced into the slot of the read/write unit by the authorized party, it is also inventively provided that the control unit is programmed to write the accounting data into the specific carrier card allocated to the respective number and to actuate an output closure (port) at the storage container for receiving the postal matter. The specific carrier card is fashioned for removal of postal matter from the receiving station by a first mail carrier as well as for input, by an authorized party, of the accounting data into a postage meter machine of the distributing station. The data transmission can likewise ensue via an alternative means (on line or off line) to the distributing station. The distributing station is at least composed of a postage meter machine and a sensor and a delivery arrangement preceding in the mail stream, the latter including a scanner for scanning the marking that was printed in the receiving station. The postage meter machine has a read/write unit for the specific carrier cards, a second non-volatile memory, a franking printer and a connection for the printout of received lists via a second printer as well as a control unit that is programmed to derive the number of the scanned piece of mail from the scanned marking data and to determine the appertaining, input accounting data, possibly with the appertaining weight, from the second non-volatile memory in order to correspondingly set the postage meter machine before the franking.

It is also advantageous that the shipper can employ a value or a customer card for paying for the service to be provided by the carrier. The debiting by value card is premised on an automatic format and thickness recognition of the pieces of mail. The value card can be a rechargeable money card. The customer card only allows the input of an identification number. A debiting does not ensue from the card but ensues either subsequently from the customer card or an invoice is prepared. A loss of the customer card is not tragic since money is thus not automatically lost as long as the first carrier is immediately notified who then can block the postage meter machine for the corresponding identification number. An added advantage is achieved due to the closure mechanism for the slot as protection against willful property damage to the receiving station in combination with the read/write unit. A card inserted into the latter is retained if vandalism is detected by additional sensors. The card owner, and possibly, the person causing the damage, can be determined via the identity number of the card. The keyboard and the display unit also can be protected in a similar way.

DESCRIPTION OF THE PREFERRED EMBODIMENTS

Figure 1A:
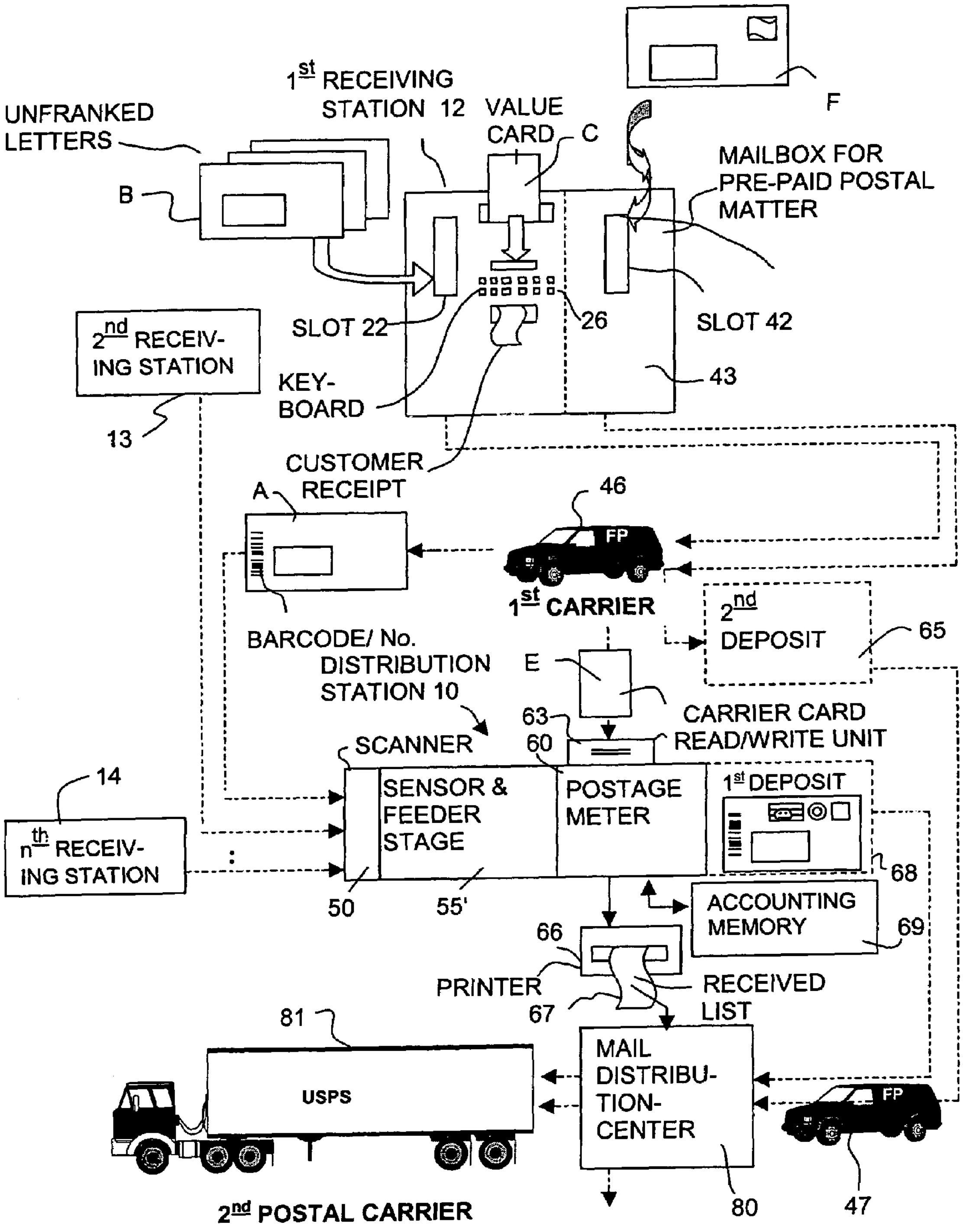
FIG. 1*a* illustrates a first version of a mail processing system with receiving stations and with a distributing station in accordance with the invention.

FIG. 1*a* shows a first version of a mail processing system with receiving stations 12, 13, 14 and with a distributing station 10. These receiving stations represent an arbitrary number n of receiving stations. The receiving stations 12, 13, 14 can be placed at gas stations, shopping centers, self-service areas of banks, in the proximity of EC automats (in Europe) and at other important locations. The distributing station 10 is located remote therefrom. For example, the frankings are undertaken in a service center. The system assumes that the sender has a value card C (i.e., a credit card) and inserts it into a slot of the receiving station 12. The receiving station 12 generates a different number for each postal matter B. The sender undertakes the required inputs for the shipping at a keyboard 26 of the receiving station in conformity with the postal matter B. A slot 22 is released by a closure. The postal matter B inserted into the slot 22 is weighed and marked inside the receiving station 12. The marking ensues, for example, with a number and/or a bar code in a predetermined area on the postal matter B. The marked, unfranked postal matter A lands in a storage container shown in FIG. 1*b*. An ordinary mailbox 43 for letters prepaid with postage stamps or meter imprints or in some other way can be arranged next to the receiving station 12 or laterally integrated therewith. In a known way, the mailbox 43 has a slot 42 for inserting the stamped letters. The data entered by the sender and internally measured in each receiving station 12, 13, 14 are non-volatilely stored. An authorized party of the first carrier has a transport 46 and routinely empties the mailboxes and storage containers of the receiving stations 12, 13, 14. Opening the receiving stations 12, 13, 14 requires an access means, such as insertion of a specific carrier card E into the corresponding slot of a read/write unit 23 of the receiving stations 12, 13, 14. For transmission of the data to the distributing station, the non-volatilely stored data are entered into a transmission means, preferably by loading into the specific carrier card E.

Upon arrival of the transport 46 at the distributing station, the franked letters are placed in a second deposit 65. The operation of the distributing station 10 initially requires a data transfer, for example an insertion of one of the specific carrier cards E into the corresponding slot of a read/write unit 63 of the postage meter machine 60, in order to transfer the data stored in the card. The appertaining postal matter now can be automatically franked according to these data. Before the franking, the postal matter passes through a sensor and feeder stage 55 and is thereby scanned by a scanner 50 in view of the marking. The marking information is communicated via the feeder 55 to the postage meter machine 60, is converted into a letter number and is checked in view of its appearance in a list of the stored data. In a known manner, the postage meter machine 60 has an accounting memory 69 that non-volatilely stores the list of stored data and wherein a debiting is undertaken. After the franking, the letters proceed into a first deposit 68 arranged downstream. A received list 67 having the stored data from the accounting memory 69 can be printed out with a printer 66 for a stack of franked pieces of mail. The printer can be connected to the postage meter machine either directly or, alternatively, via a personal computer (not shown). The stack of franked pieces of mail from the first deposit 68 with the received list 67 and the stamped letters from the second deposit 65 are delivered by a transport 47 of the first carrier to a mail distribution center 80 of the second carrier and are further-transported with the transport 81 of the latter to the addressee or distribution locations in order to distribute the mail.

Figure 1B:
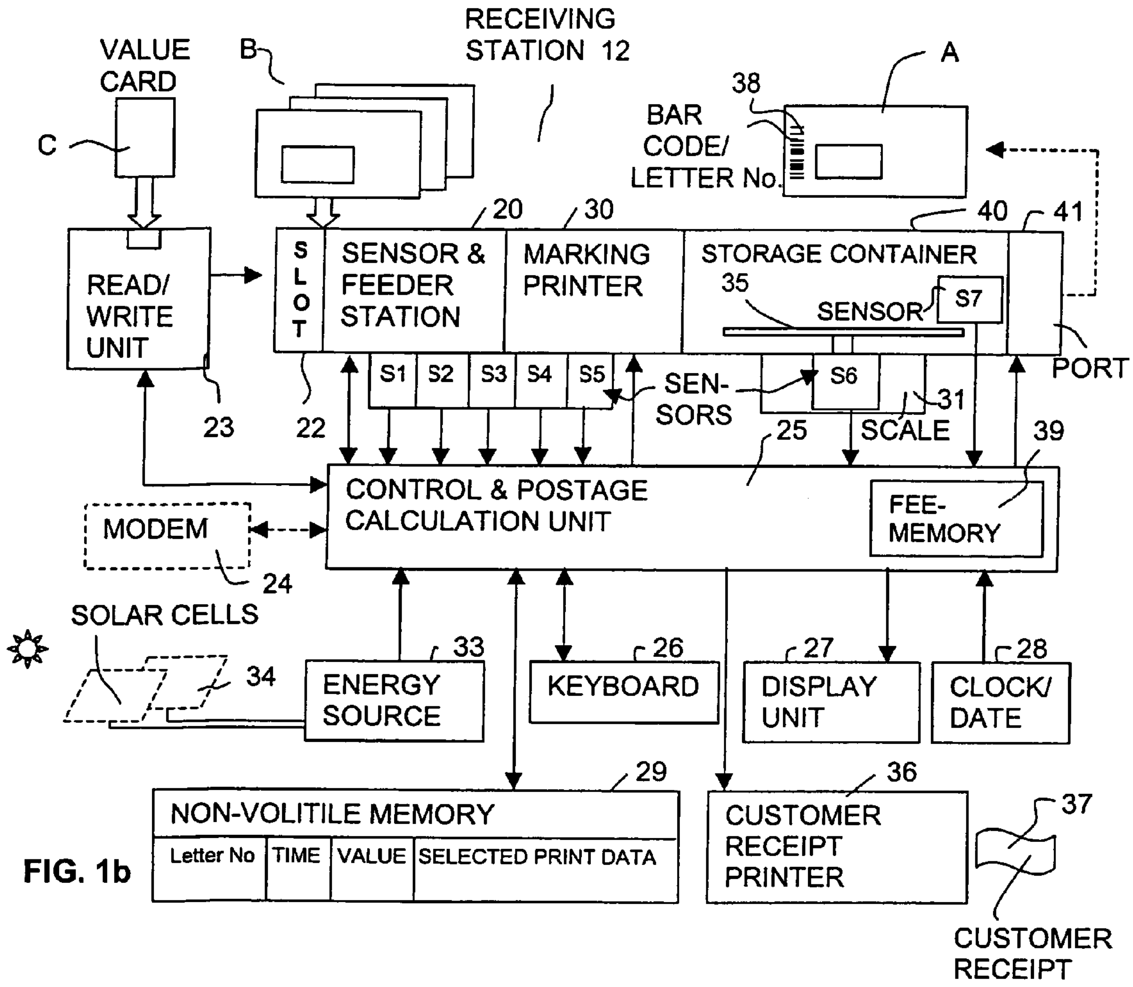
FIG. 1*b* is a block circuit diagram of the receiving station in the first version.

FIG. 1*b* shows a block circuit diagram of the receiving station 12 of the first version. The read/write unit 23 is connected in terms of control to a drive (not shown) of a closure mechanism of the slot 22 and to a unit 25 for control and postage calculation. Since the slot 22 is only opened given an inserted card, there is effective protection against vandalism for the postal matter within the receiving station. The slot 22 is arranged upstream of a scanner and feeder 20 at the housing of the receiving station. A marking printer 30 is arranged downstream of the scanner and feeder 20. Alternatively, the marking printer can also be a component part of the scanner and feeder 20. The marking with the marking printer 20 can thus advantageously ensue upon or immediately after the deposit of the postal matter B. A storage container 40 for marked postal matter is arranged downstream behind the marking printer 30. A static scale 31, which includes a weighing pan 35 and a weighing cell S6, is a component of the storage container 40. A port 41 with appertaining, controllable opening device is arranged at the housing of the receiving station. The weighing cell S6 contains electronics for the transmission of a weight signal to the control unit 25. The weight of the individually supplied pieces of mail is determined in the control unit 25 according to the difference method.

The presence of postal matter B to be delivered to the mail stream is detected with a sensor S1. The sensors S2 and S3 are for a format identification, the sensor S3 is for a thickness identification, and the sensor S5 is for a determination of the position of the supplied postal matter B in the transport path, and the sensor S7 allows a determination of the filling level to be undertaken by the control unit 25. A suitable scanner and feeder is disclosed in German patent application 19912807.3. Inventively, the marking printer 30 is additionally provided in this latter solution. For example, an arrangement of the marking printer 30 and the sensor S1 ensues in the pre-separation region.

The control unit 25 is connected to the aforementioned components 20, 22, 23, 30, 41 in terms of control. The control unit 25 is equipped with a fee memory 39 and is programmed for calculating postage. The current rate for calculating the postage can be reloaded via the write/read unit 23 connected to the control unit 25 with a RATE TABLE chip card, or optionally via a connected modem 24. A display unit 27, a clock/date module 28, a non-volatile memory 29 and a customer record printer 36 are connected to the control unit 25. The customer record printer 36 can print out the number of the piece of mail, the time data and the shipping data input upon mail deposit as a customer record. The keyboard 26 and the display unit 27 form a user interface and can be fashioned combined with one another (soft keys) are integrated (touch screen). The user interface can likewise be protected against damage, for example vandalism, by a closure mechanism.

It is optionally provided that the receiving station is supplied with power from an autonomous energy source 33, can be connected to solar collectors 34.

Figure 1C:
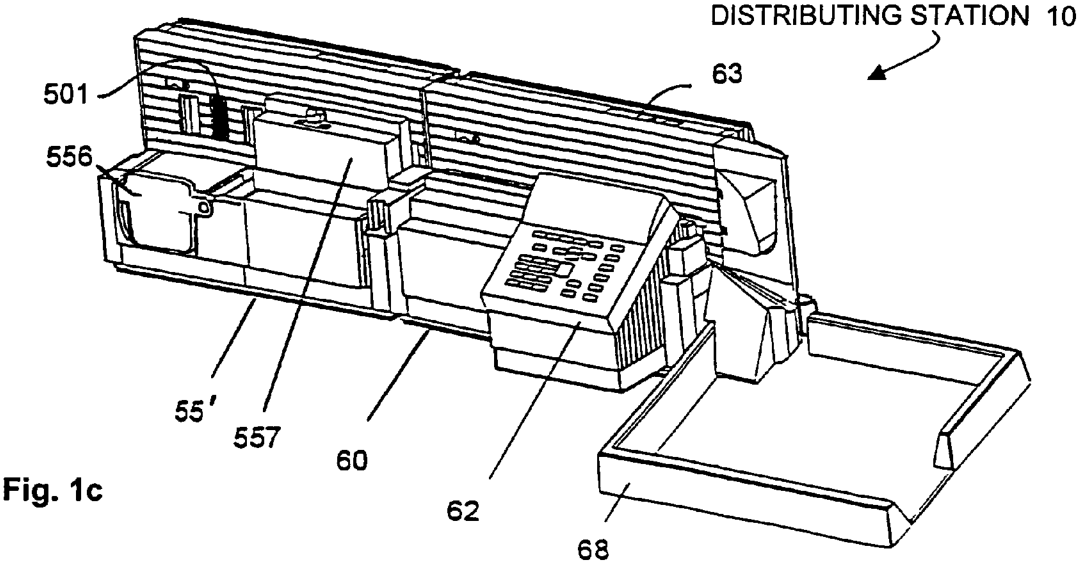
FIG. 1*c* is a perspective view of the distributing station in the first version.

FIG. 1*c* shows a perspective view of the distributing station of the first version, having a sensor and feeder 55, a postage meter machine 60 and a deposit 68. A scanner 50 is arranged in an opening at the mail application point of a lateral guide plate, for example in the separation area between the openings in the guide plate for two drive drums. A commercially available scanner, for example of the type LS 4100 of the Datalogic company, is utilized as scanner for a bar code. A sensor and feeder 55 suitable for such mixed mail processing is explained in greater detail with reference to FIG. 3. After the letters are applied, a pressure applicator is actuated, for example a plate 556 is pivoted into a position that presses the stack of letters against the guide plate, so that the letter placed at the bottom is scanned first. The stack is separated by the scanned letter being transported in the direction of the storage container. A separation of the supplied letters is undertaken under the cover 557, as disclosed in German PS 196 05 017, corresponding to U.S. Pat. No. 5,954,324, and in the aforementioned German Patent Application 199 12 807.3

In a known manner, the postage meter machine 60 is composed of a meter 62 and a base. A system based on the postage meter machine Jet Mail® of Francotyp-Postalia AG & Co. is particularly suited, as disclosed in detail in, among others, European Patent Applications 875 864 and 901 108. The base is equipped with a chip card read/write unit 63 that is arranged behind a guide plate and is accessible proceeding from an upper housing edge. After the postage meter machine is turned on with a switch next to the read/write unit 63, a carrier card E can be inserted into an insertion slot from top to bottom. A supplied letter A that stands on edge and that has its surface to be printed lying against the guide plate is then printed with a meter stamp according to the input data and then drops into the deposit box 68.

The feeder 20 in the receiving station 12 can have the same structural format as the feeder 55 in the distributing station 10. The feeder 20 of the receiving station 12 (shown in FIG. 1*b*), however, can be additionally equipped with sensors for sensing the format and the thickness of the postal matter. A scale 31 with the weighing cell S6 for weight measurement is arranged following the sensor and feeder 20. The sensor data and the weight measured with the scale 31 are communicated to the control unit 25. The control unit 25 controls the transport of the postal matter and is fashioned for calculating postage. The customer's card is a value card C. The debiting of the postage from the value card C and a logging of the shipping data are undertaken in the non-volatile memory 29 of the control unit 25 of the receiving station 12. The control unit is programmed to undertake a debiting from the value card C via the read/write unit 23 after the marking has been printed.

The inventive method includes the following steps: A card of the customer is identified when it is inserted into a first read/write unit 23 of the receiving station and input of shipping data. A number for a piece of mail B is generated and the number and the entered shipping data are written into a first memory 29 of the receiving station. The slot 22 of the receiving station is enabled for the purpose of feeding the postal matter. The postal matter B are marked at the receiving station. Further relevant data are entered into the first memory 29 of the receiving station. The marked postal matter A is intermediately stored in the storage container 40 of the receiving station. A specific carrier card E is inserted into the first read/write unit 23 and the accounting data are loaded from the first memory 29 into the memory of the specific carrier card E. The port 41 of the storage container 40 with the specific carrier card E is opened for removing the marked postal matter A. The marked postal matter A and the specific carrier card E are transported by a first mail carrier 46 to the remote postage meter machine 60 in a distributing station. The specific carrier card E is inserted into a remote, second read/write unit 63 and the accounting data are loaded from the memory of the specific carrier card E into a second memory 69 of the postage mater machine 60. The postal matter A is inserted into a sensor and feeder 55 upstream of the postage meter machine of the distributing station. Correspondingly marked postal matter A are franked dependent on the appertaining accounting data in the second memory 69. A list 67 is printed with a second printer 66. A first mail carrier 47 transports the franked postal matter with the appertaining received list 67 to a second mail carrier in a remote mail distribution center 80 for mail distribution by the second mail carrier 81.

As noted above, the customer's card is a value card C. The delivery of postal matter is detected by a first sensor S1. The step of entering further relevant data into the first memory 29 of the receiving station includes at least one time of day and date input by the clock/date module 28.

When the customer's card is a value card C, the step of entering further relevant data into the first memory 29 of the receiving station includes an automatic data input by further sensors S2 and S4 for sensing the format and by sensor S3 for the thickness of the piece of mail in the feeder 20 and from the weighing cell S6 for weight measurement in a scale 31, 35 of the receiving station with subsequent calculation and debiting of the postage from the value card C. A suitable embodiment for the sensor and feeder stage 20 with the sensors S2 through S5 is disclosed in greater detail in the German Application 199 12 807.3.

Figure 2A:
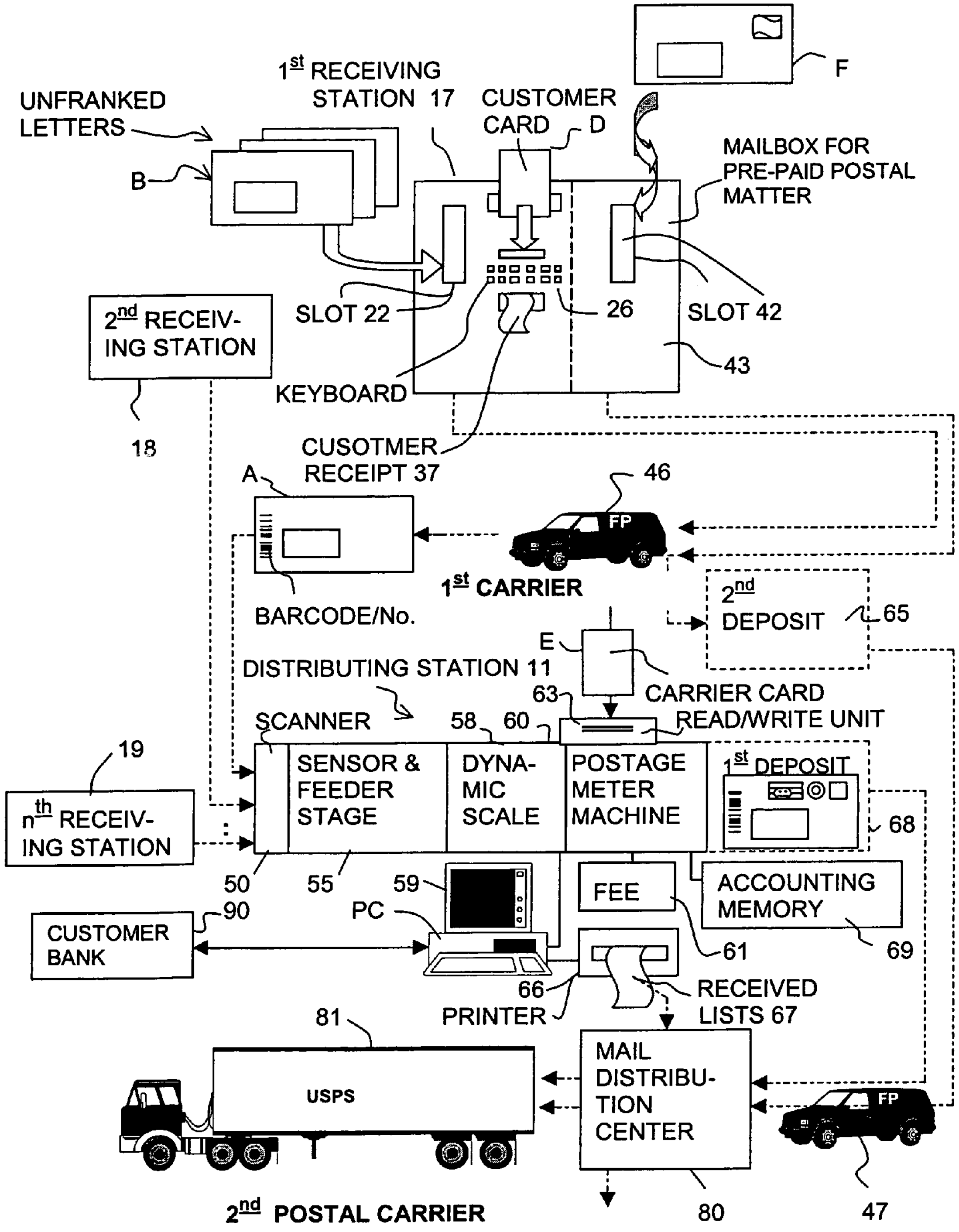
FIG. 2*a* illustrates a second version of a mail processing system with receiving stations and with a distributing station in accordance with the invention.

A further system differs from the system of FIGS. 1*a*, 1*b* and 1*c* in that the customer's card is a customer card D (i.e., a debit card) that has an identification number is shown in FIG. 2*a* with receiving stations and with a distributing station. Advantageously, the sensors for determining format and thickness as well as a scale can be eliminated in the receiving stations. The receiving station thus can be more economically manufactured, which can be seen from FIG. 2*b*. Therein, the identification number together with the shipping data, the time of day, the date and the generated number are stored in a first memory 29 of the receiving station. When the deposit of postal matter is detected by a first sensor S1, then the marking is triggered. A customer receipt 37 is also printed out.

It can be seen from FIG. 2*a* that a communication of the stored data to the postage meter machine 60 of the distributing station 60 can again ensue with the specific carrier card E. After the step of inserting the postal matter into a sensor and feeder 55 of the distributing station, the distributing station implements a sensing of the format and of the thickness of the piece of mail in the feeder 55 and a weight measurement in a dynamic scale 58 for the postage meter machine 60 of the distributing station 60. A more detailed specification of a suitable sensor and feeder 55 with sensors for sensing the format and the thickness of the piece of mail are disclosed in German Application 199 12 807.3.

Further details about the structural format of a suitable dynamic scale are disclosed in German Patent Application 198 33 767.1-53. The control, for example, can ensue as disclosed in German Applications 198 60 296.0 or 198 60 295.2. The weight measurement in a dynamic scale preferably ensues according to German Patent Application 198 60 294.4.

After the calculation of the postage, the debiting of the postage from the customer account ensues at the customer bank 90 or from the account at the data center via telepostage. A personal computer 59 preferably has a communication connection with the customer bank 90. The letter remains unfranked when a debiting of the postage from the customer account cannot be undertaken. In a way that is not shown, the first deposit 68 can be equipped with a shunt or with an additional eject compartment with third deposit for unfranked letters. It is advantageous for operation when the personal computer 59 is connected to the postage mater machine 60 and to the printer 66 for the received lists 67. A rate memory 61 and an accounting memory are required for calculating the postage in the deposit station, these preferably being components of the postage meter machine.

A meter generally forms a (second) control unit for the postage meter machine base.

According to an alternative proposal, the meter function of the postage meter machine can be assumed by the personal computer 59. Such a printing machine base station controlled by a personal computer has been disclosed in detail in, for example, European Application 866 427.

Figure 2B:
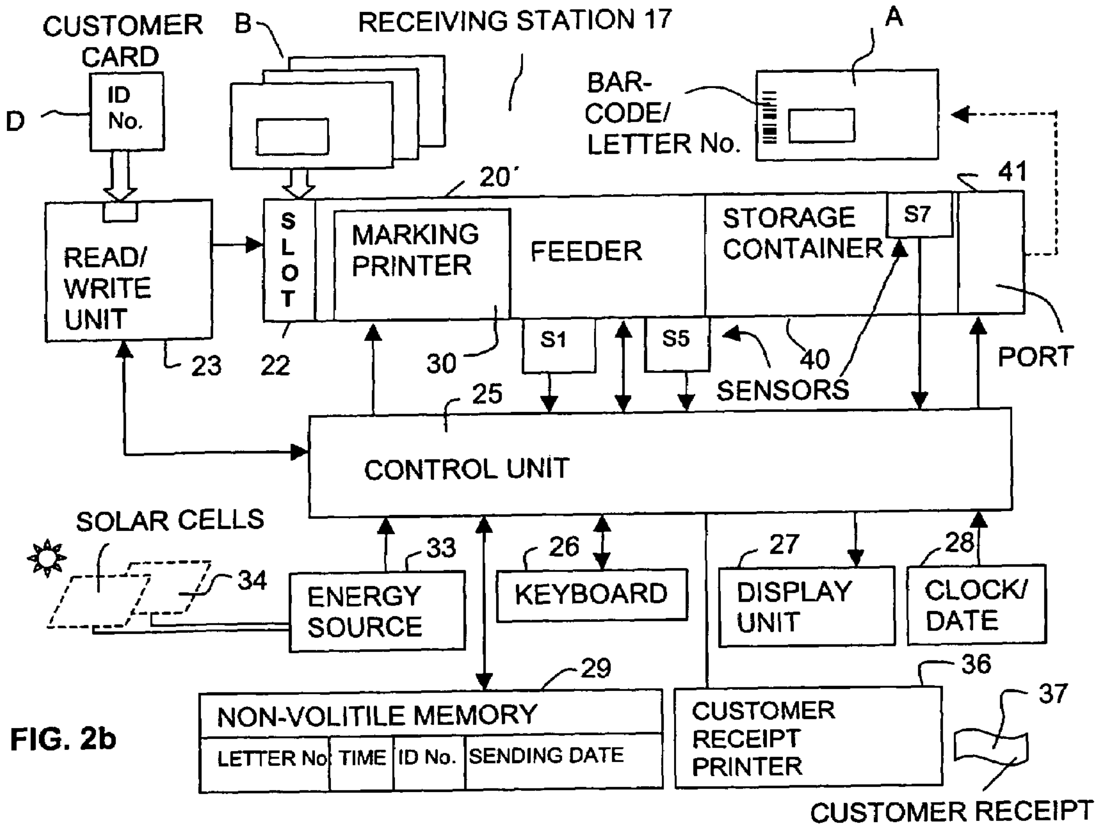
FIG. 2*b* is a block circuit diagram of the receiving station in the second version.

FIG. 2*b* shows a block circuit diagram of the receiving station according to the second version. A feeder 20' is arranged preceding the marking printer 30, i.e. upstream, and a slot 22 with closure mechanism is again arranged preceding the feeder 20', this closure mechanism being again driven by the read/write unit 23. The opened slot 22 allows an insertion of at least one large-format letter having a width of 250 mm and a thickness of 55 mm into the feeder 20' or, alternatively, an insertion of a stack of letters with smaller formats and/or thickness.

A suitable feeder with pre-separation and printer can, for example, be constructed as explained in greater detail with reference to FIG. 2*c*. Sensors for the format and thickness measurement are not required, differing from the first version. Inventively, an ink jet printer 30 is arranged in the pre-separation area as marking printer.

Differing from the conventional, generally practiced procedure, the letters of a stack are inventively printed first and then separated or removed. As a result, the entire letter acquisition or sensing and print control can be significantly simplified. Letters of an arbitrary thickness up to small packages thus can be directly printed with a bar code and mixed mail B of slight thickness deposited in stacks can be automatically processed. Compared to a purely manual system apparatus, a significant enhancement of the processing speed is achieved given automatic stack processing.

As schematically shown in FIG. 2*b*, the common storage container 40 for marked postal matter A is again arranged downstream, following marking printer 30 and feeder 20'. Differing from the first version, however, the installation of a scale is eliminated. The receiving station can, for example, have a cabinet-like structure, whereby the slot 22, the read/write unit 23, if present, a modem 23, the control unit 25, the keyboard 26, the display unit 27, the clock/date module 28, the non-volatile memories 29 and 39, the customer record printer 36 as well as the port 41 are built into a door. The port 41 allows the authorized carrier to unlock the door in order to open it. The control unit 25 is again connected for control purposes to the aforementioned components 20', 22, 23 29, 30, 36, 41. The energy source 33, the feeder 20' with the marking printer 30 and the common storage container 40 are arranged in the inside of the cabinet, so that the storage container 40 can be emptied when the door is opened. Such a receiving station can be placed at an arbitrary location.

In combination with a number of letters from a stack of letters deposited in the mail, the document 37 printed by the forms printer 36 enables a known recording for the postal customer with respect to the printing of the identification number on the postal matter in the receiving station.

In a preferred embodiment of the invention, the feeder 20' and a marking printer 30 preceding a storage container 40 are arranged in the receiving station in the direction of the mail stream and are connected to the control unit 25.

The feeder 20' has an input closure with a slot 22 that can be driven by the read/write unit 23, so that the sender can insert at least one piece of mail B through the slot 22 into the feeder 20' only given a card D inserted into a slit of the read/write unit 23 by the sender;

A non-volatile memory 29 for accounting data and a clock/date module 28 are connected to the control unit 25.

The control unit 25 is programmed to allocate a number to every piece of mail and, dependent on the shipping data actuated via the keyboard 26, to undertake an accounting in the non-volatile memory 29 under the aforementioned number and to drive the marking printer 30 to print this number on the piece of mail B while it is being transported downstream.

Given a specific carrier card E inserted into the slot of the read/write unit 23 by an authorized party, the control unit 25 is programmed to write the accounting data into the specific carrier card E allocated to the respective numbers, to actuate an output closure port 41 at the storage container for removing the postal matter.

The specific carrier card E is fashioned for removal of postal matter from the receiving station by a first mail carrier 46 and for inputting the accounting data into a postage meter machine 60 of the distributing station by a party authorized to do so.

The distributing station is composed at least of a postage meter machine 60 and a sensor and feeder 55 preceding this in the mail stream. The sensor and feeder stage 55 has a scanner 50 for scanning the marking that was printed on the item in the receiving station.

The postage meter machine 60 has a read/write unit 63 for the specific carrier cards E, a second non-volatile memory 69, a franking printer and a connection for the printout of received lists 67 via a second printer 68 as well as a second control unit that is programmed to derive the number of the respective piece of mail from the sensed marking data and to determine the appertaining input accounting data from the second non-volatile memory 69 in order to undertake a corresponding setting of the postage meter machine before the franking.

The control unit 25 of the receiving station 17 is programmed—after the insertion of a customer card D into the read/write unit 23—to non-volatilely store the identification number allocated to the number of the postal matter, the date and the time of day as well as the shipping data that have been input in the first memory 29 of the receiving station 17. The control unit 25 of the receiving station 17 is also programmed—after insertion of a specific carrier card E—to load the stored data into the memory of the carrier card E, so that a debiting from the customer account at a bank 90 of the customer can be undertaken after the marking but before the franking.

Figure 2C:
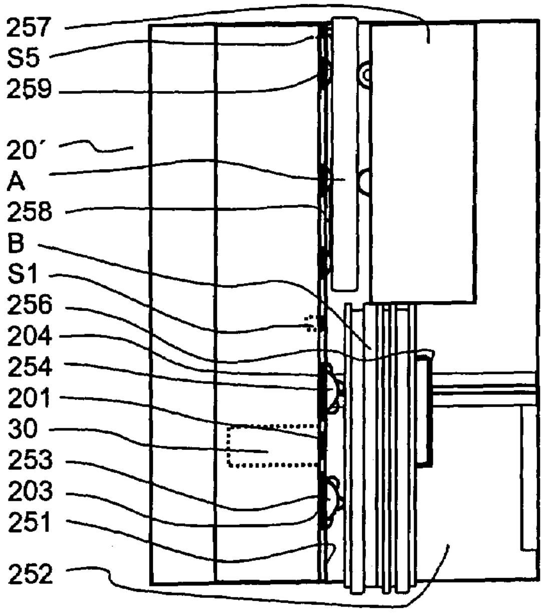
FIG. 2*c* is a plan view of a printing feeder arrangement of the distribution station in the second version.

FIG. 2*c* shows a plan view of a printing feeder of the receiving station 17 according to the second version. After being deposited, the postal matter A resides on a lower guide plate 252 parallel to a lateral guide plate 251. The guide plate 251 has openings for the transport, printing and sensor means. An opening 201 for the printer 30 is arranged in the pre-separation area between the openings 203 and 204 for the drive drums 253, 354. For example, an ink jet printer is utilized as marking printer. For the purpose of depositing the mail, the applicator 256, in conjunction with the opening of the slot, a driven by an actuator (not shown) until they are at a maximum distance from the lateral guide plate 251. The covering 257 of the mechanism in the separation area limits the depth of the deposit region and simultaneously forms a stop edge for a stack of mail (mixed mail). A sensor S1, for example a light reflex sensor, signals the presence of at least one piece of mail in the pre-separation area. Before or after the input of the shipping parameters, the printer 30 prints a marking, and the applicator 256—driven by the actuator (not shown)—is activated to resiliently press the stack against the printing region. After the marking has been printed, the printed piece of mail, driven by the drive drums 253, 354, is moved forward to the separation area, and drive belts 258 and an ejector 259 assume the further transport to the storage container 40. A sensor S5, for example a light barrier, signals the ejection of the at least one piece of mail into the storage container 40.

Figure 2D:
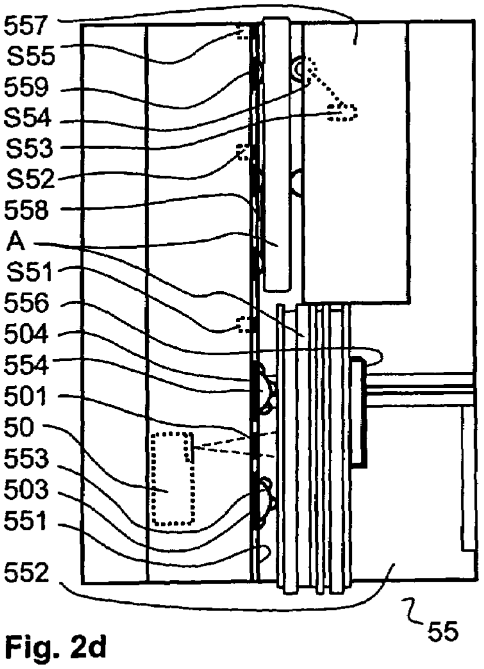
FIG. 2*d* is a plan view of a sensor and feeder arrangement of the distributing station in the second version.

FIG. 2*d* shows a plan view of a sensor and feeder stage 55 of the distributing station 11 according to the second version. The mechanical structure can ensue in the same way as set forth in FIG. 2*c*, but a sensor 50 is arranged in a window-like opening 501 of the lateral guide plate 551 instead of the printer 30 in order to scan a bar code that has been printed on the posted item. The lateral guide plate has openings for the transport, scanner and sensors. The opening for the scanner 50 is arranged between the openings 503 and 504 for the drive drums 553, 554, whereby the sensor S1 and the applicator 556 have an additional protective function for the eyes. A laser beam is shut off on the basis of the sensor signal of the sensor S1 so that the laser beam of the laser scanner is not directed directly into the eye of the observer when a letter is not applied to the sensor and feeder stage 55. The bar code is then scanned only during the separating. Moreover, the contact pressure bow 556 is sufficiently wide so that no laser beam can proceed directly into the eye of the observer during operation of the sensor and feeder stage 55.

A suitable scanner is the type LS4100 of the Datalogic company having the dimensions 84×68×28 mm. The scanner LS4100 is mounted at a distance of at least 40 mm from the guide plate 551. An embodiment having a 90° deflection mirror at the scanner is employed. This type allows a maximum scan rate of Smax=800 scans/sec.

A piece of mail is transported with the velocity V=630 mm/sec and preferably carries a bar code with lines parallel to the transport direction. The length of the lines L and the velocity V of the piece of mail enter into the number of effective scans N. The following equation applies:

$$N=\{(L/V)\cdot Smax\}-2 \quad (1)$$

A vertically glued label with a 10 mm bar code line length on a letter that is transported at 630 mm/sec yields a number of (800·10/630)−2=10 effective scans, which is adequate for the sensor and feeder of the JetMail® postage meter machine in order to distinguish a bar code from other imprints (address) on the basis of the redundancy of the measured values.

Figure 2E:
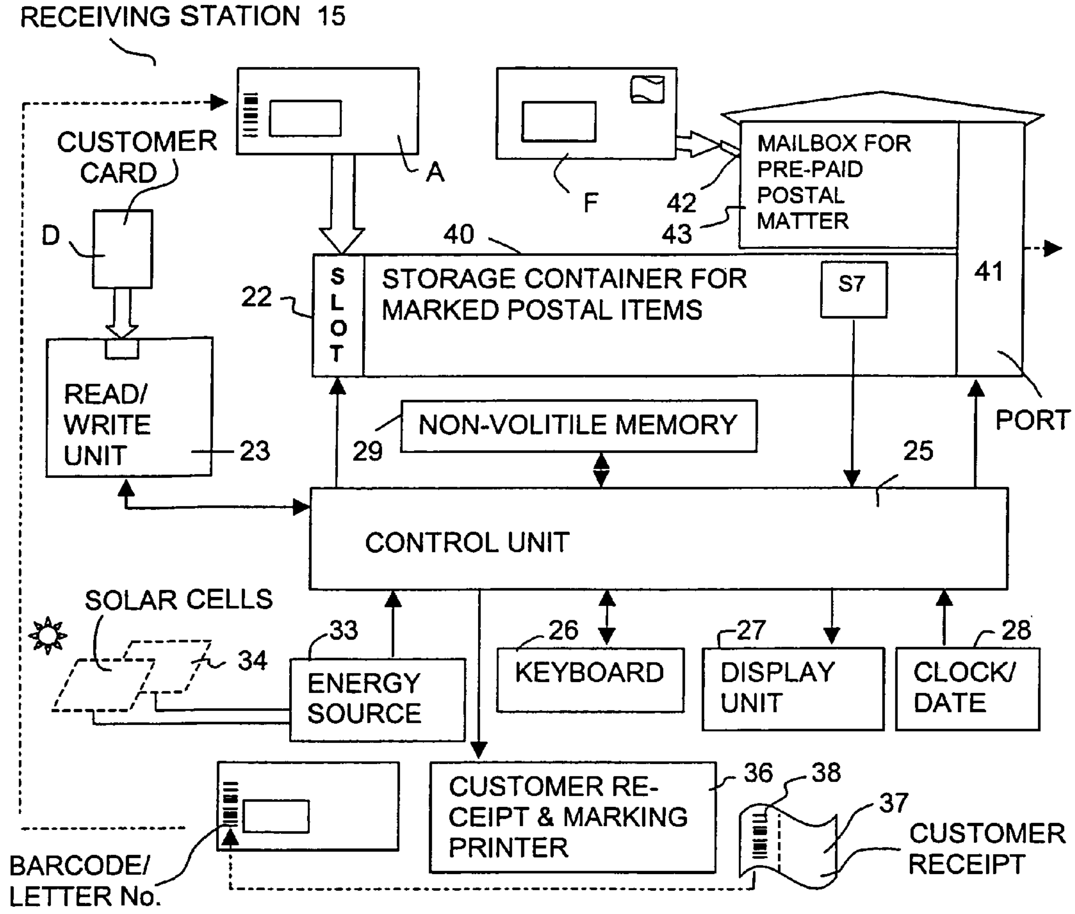
FIG. 2*e* is a block circuit diagram of the receiving station in a third version.

FIG. 2*e* shows a block circuit diagram of a receiving station 15 according to a third version. The separate marking printer is also eliminated in this most economic version. The function thereof is assumed by the forms printer. The form 27 printed out by the customer receipt and marking printer 36 after the card identification number, the generated letter number and the input shipping data have been stored in the non-volatile memory 29 contains a section 38 with the bar code corresponding to the generated letter number. The letter number can be printed out together with the bar code, so that the section 38 is human-readable and machine-readable. The section 38 is implemented as a self-adhesive tape and is glued onto the piece of mail A by the person sending the letter. The piece of mail A can then be inserted into the storage container 40 through the open slot 22. The container 40 and a separate mailbox 42 with a slot 22 for inserting stamped letters can be opened by carrier card E. The control unit 25 control a common port 41 in order to open the storage container 40 and the separate mailbox 42 for the purpose of being emptied by the first carrier.

The postal matter processing system has a storage container 40 with a filling level sensor S7 that is connected to the control unit 25 is arranged in the receiving station.

The storage container 40 has an input closure with a slot 22 that can be driven by the control unit 25, so that the customer can only insert postal matter A through the slot into the storage container when a card D has been inserted into a slit of the read/write unit 23 by the sender.

A non-volatile memory 29 for accounting data and a clock/date module as well as a customer form and marking printer 36 are connected to the control unit 25.

The control unit 25 is programmed to assign a number to every piece of mail B and, dependent on the shipping inputs actuated via the keyboard 26, to undertake an accounting entry in the non-volatile memory 29 under the aforementioned number and to drive the customer form and marking printer 36 in order to print the aforementioned number of the postal matter, the time data and the shipping data that was entered when the mail was deposited as a customer form, and to print a marking on a section 38 that is provided for being applied to the postal matter B.

The control unit 25 is also programmed, given insertion of a specific carrier card E in the slot of the read/write unit 23 by an authorized party, to write the accounting data into the specific carrier card E allocated to the respective numbers, to actuate an output closure (port 41) at the storage container for removal of the postal matter.

The specific carrier card E is fashioned for removal of postal matter from the receiving station by a first mail carrier 46 and for the input of the accounting data into a postage meter machine 60 of a distributing station by a person authorized to do so.

The distributing station at least includes a postage meter machine 60 and a sensor and feeder stage 55 preceding in the mail stream. The sensor and feeder stage 55 includes a scanner 50 for scanning the marking printed on in the receiving station.

The postage meter machine 60 has a read/write unit 63 for the specific carrier cards E, a second non-volatile memory 69, a franking printer and a connection for the printout of received lists 67 via a second printer 66 as well as a control unit 59, 62 that is programmed to derive the number of the postal matter from the scanned marking data, and to determined the appertaining input accounting data from the second non-volatile memory 69 in order to undertake a corresponding setting of the postage meter machine 60 before the franking and a debiting from the customer account at a customer bank 90 after the marking but before the franking.

Figure 2F:
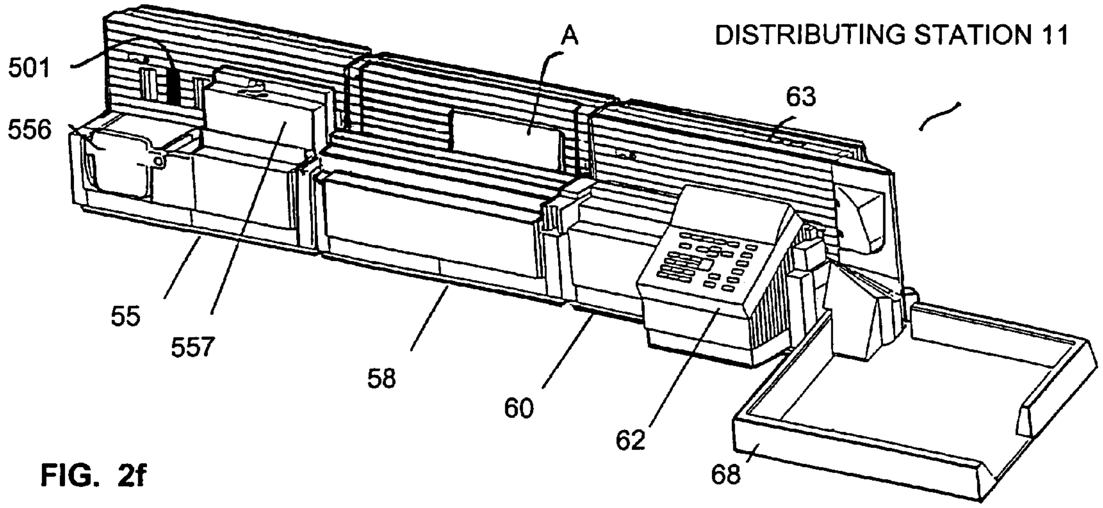
FIG. 2*f* is a perspective view of the distributing station in the second version.

FIG. 2*f* shows a perspective view of the distributing station 11 according to the second version of the postal matter processing system. Such a distributing station 11 can frank postal matter that was marked in relatively simply constructed receiving stations 15 or 17, 18, 19. The distributing station 11 has a sensor and feeder stage 55 suitable for mixed mail processing, a dynamic scale 58, a postage meter machine 60 and a deposit 68. A scanner 50 is arranged behind an opening in the pre-separation area. The scanner, for example of the type LS4100 of the Datalogic company, is employed as scanner for the bar code marking. The postage meter machine 60 of the distributing station has a rate memory 61 for calculating the postage according to current rate schedules.

In this version of the inventive method an identification number of a customer card D together with the shipping data, the time of day, the date and a generated number are stored in the first memory 29 of the receiving station 15.

The number of the piece of mail, the time data and the shipping data input upon deposit of the mail are printed as customer receipt 37 and a marking 38 is printed by a customer form and marking printer 36 of the receiving station.

The application of a machine-readable marking 38 to the postal matter B ensues externally of the receiving station 15 and enabling the slot 22 of the receiving station 15 for marked postal matter A ensues.

After storing, the marked postal matter A is transported by a first mail carrier 46 to the distributing station 11, whereby a communication of the stored data to the postage meter machine 60 of the distributing station 11 ensues with a specific carrier card E.

The insertion of the postal matter into a sensor and feeder means 55 of the distributing station is detected with a sensor S51, as a result of which a scanning of the marking with a scanner 50 is triggered.

Sensing of the format and of the thickness of the postal matter is implemented in the feeder stage 55 and a weight measurement is implemented in a scale 58 before the franking with the postage meter machine.

Debiting of the postage from the customer account ensues after the calculation of the postage.

Figure 3:
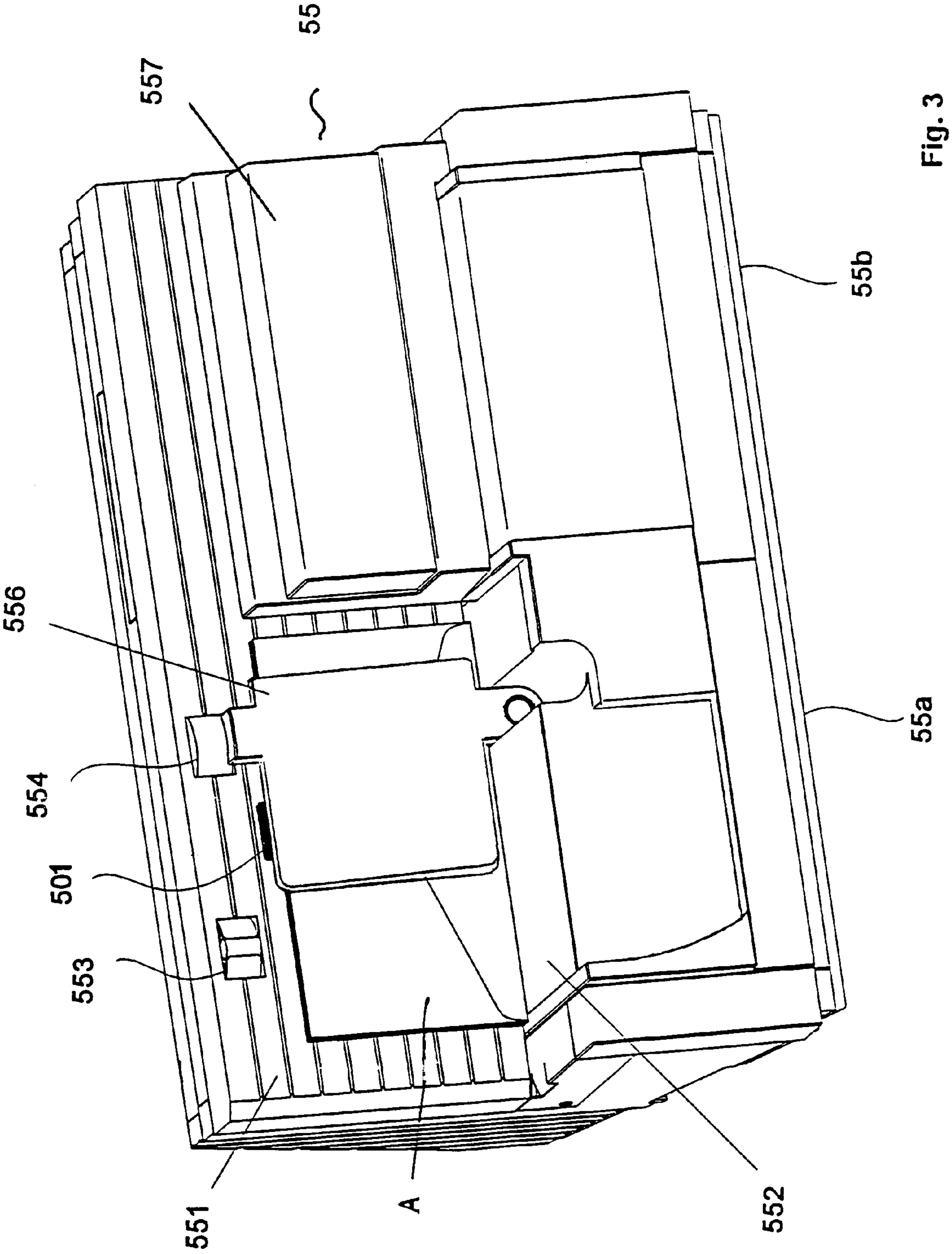
FIG. 3 is a perspective view of a sensor and feeder arrangement.

FIG. 3 shows a perspective view of a sensor and feeder stage 55 in the distributing station. The feeder stage 55 is functionally divided into a pre-separation area 55*a* and a separation area 55*b*. A back guide plate 551 that is inclined slightly back and a lower guide plate 552 that is orthogonal thereto are provided for guiding the letters A. A commercially available scanner 50 for scanning the marking printed on in the receiving station is arranged in the pre-separation area 55*a* behind an opening 501 of the guide plate 551.

As a stack, the letters A are arranged with non-positive lock between an applicator 556 and the back guide plate 551 with the edge of their envelope flap standing on the lower guide plate 552. The applicator 556 can be pivoted out of an idle position into the illustrated operating position and is arranged lockable.

On the basis of two drive drum combinations 553, 554, which, due to their specific fashioning, effect a loosening of the letter stack, the letters A are pushed one after the other from the pre-separation area 55*a* into the separation area 55*b* gliding along the back guide plate 551. Further details about the mechanics in the separation area 55*b* are disclosed in German Patent Applications 198 36 235.8 and 199 12 807.3.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for processing postal matter comprising the steps of:

providing a receiving station having no security against monetary theft and at said receiving station allowing a customer to deposit a postal item to be shipped by a shipper that requires payment before shipping said item, and to enter shipping data for said postal item into said receiving station, requiring said customer to arrange for payment for said shipping at said receiving station, and, at said receiving station, printing a machine-readable marking, not governmentally approved for franking, on said postal item representing said shipping data, to produce a marked but unfranked postal item, and temporarily storing said marked postal item at said receiving station;

transporting said marked postal item to a distributing station, remote from and unconnected to said receiving station, and providing a franking apparatus and a memory accessible by said franking apparatus at said distributing station, and transferring said shipping data from said marking into said memory at said distributing station; and franking said postal item with said franking apparatus with a governmentally approved franking imprint at said distributing station according to said shipping data transferred from said marking and stored in said memory to produce a franked postal item.

2. A method as claimed in claim 1 wherein said memory at said distributing station is a first memory, and said method comprising:

at said receiving station, providing a first read/write unit and a normally closed slot for inserting said postal item, and providing a normally closed removal port for removing said marked postal item from said receiving station;

said customer inserting a customer-possessed card, into said read/write unit;

enabling opening of said slot to allow said postal item to be deposited at said receiving station while said customer-possessed card is in said read/write unit;

generating a number at said read/write unit uniquely allocated to the postal item deposited by said customer;

printing said number on said postal item together with said marking at said receiving station;

providing a second memory at said receiving station and storing said number and said shipping data, as accounting data, in said second memory;

for removing said marked postal item from said receiving station, inserting a carrier card possessed by a first mail carrier, having a carrier card memory, into said first read/write unit at said receiving station and loading said accounting data from said second memory into said carrier card memory;

enabling opening of said removal port at said receiving station while said carrier card is inserted in said first read/write unit and removing said marked postal item from said receiving station;

wherein the step of transporting said marked postal item to said distributing station comprises transporting said marked postal item to said distributing station via said first mail carrier together with said carrier card;

providing a second read/write unit at said distributing station and inserting said carrier card into said second write/read unit and downloading said accounting data from said carrier card memory into said first memory;

providing a sensor and feeder stage upstream from said franking apparatus at said distributing station and entering said marked postal item into said sensor and feeder stage;

after franking said marked postal item with said franking apparatus at said distributing station, printing a list at said distributing station identifying said postal item as having been franked; and said first mail carrier transporting said franked postal item from said distributing station, together with said list, to a mail distribution center remote from said distributing station; and from said mail distribution station, delivering said franked postal item to a recipient identified by said shipping data via a second mail carrier.

3. A method as claimed in claim 2 wherein said customer-possessed card is a value card.

4. A method as claimed in claim 2 further comprising providing a sensor at said receiving station which detects deposit of said postal item at said receiving station through said slot, and providing a clock/date module at said receiving station, which, depending on a signal from said sensor, identifies a time and date at which said postal item was deposited at said receiving station; and storing said time and date in said second memory at said receiving station allocated to said number and said shipping data.

5. A method as claimed in claim 2 wherein said customer-possessed card is a value card, and comprising the steps of:

at said receiving station, providing a plurality of sensors for respectively identifying a format of said postal item, a thickness of said postal item and a weight of said postal item, and providing a postal calculation unit at said receiving station;

supplying said postal calculation unit at said receiving station with signals from said plurality of sensors and, in said postal calculation unit, calculating a cost of shipping said item dependent on said shipping data, said format, said thickness and said weight; and debiting said value card in said read/write unit by said cost.

6. A method as claimed in claim 2 wherein said customer-possessed card is a customer card containing an identification number uniquely allocated to a customer, and comprising the steps of:

reading said identification number from said customer card in said first read/write unit and storing said identification number in said second memory at said receiving station as part of said accounting data;

in said sensor and feeder stage at said distributing station, detecting a format, a thickness and a weight of said marked postal item;

providing a postal calculation unit at said distributing station and supplying said postal calculating unit with information identifying said format, thickness, weight and said accounting data and, in said postal calculating unit, calculating a cost of shipping said marked postal item from said format, thickness, weight and shipping data; and debiting a customer account, identified by said identification number, by said cost.

7. A method as claimed in claim 6 comprising the steps of:

providing a sensor at said receiving station which detects deposit of said postal item at said receiving station through said slot, and providing a clock/date module at said receiving station which, upon receipt of a signal from said sensor, identifies a time and date at which said postal item was deposited at said receiving station; and printing a customer receipt at said receiving station identifying said number, said time and date and said shipping data and making said customer receipt available to said customer at said receiving station.

8. A method as claimed in claim 1 wherein said memory at said distributing station is a first memory, and comprising the steps of:

at said receiving station, providing a first read/write unit, a normally closed slot for inserting said postal item into said receiving station, and a normally closed removal port for removing said marked postal item from said receiving station;

inserting a customer card into said first read/write unit at said receiving station, said customer card containing an identification number uniquely identifying a customer, and enabling opening of said slot when said customer card is inserted in said read/write unit;

providing a sensor at said receiving station which senses deposit of said postal item into said receiving station through said slot, and providing a clock/date module which identifies a time and date, dependent on a signal from said sensor, at which said postal item was deposited at said receiving station;

at said first read/write unit, generating a unique number for said postal item deposited at said receiving station;

providing a second memory at said receiving station and storing said number, said identification number, said time and date and said shipping data in said second memory;

using a single printer at said receiving station, printing a customer receipt at said receiving station including at least said number, said time and date and said shipping data and also printing said marking including said number, said time and date and said shipping data;

inserting a carrier card having a carrier card memory, possessed by a first mail carrier, into said first read/write unit at said receiving station and enabling opening of said removal port while said carrier card is inserted in said first read/write unit and transferring said number, said identification number and said shipping data to said carrier card memory from said second memory;

said second carrier transporting said marked postal item from said receiving station to said distributing station together with said carrier card;

providing a second read/write unit at said distributing station and inserting said carrier card into said second read/write unit and downloading said number, said identification number and said shipping data from said carrier card memory into said first memory;

at said distributing station, scanning said machine-readable marking and identifying a weight of said marked postal item;

providing a postal calculating unit at said distributing station and supplying said postal calculating unit with said weight and said shipping data and calculating a cost of shipping said marked postal item in said postal calculating unit;

franking said marked postal item with said cost at said franking apparatus;

debiting a customer account, allocated to said identification number, by said cost; and said first mail carrier transporting said franked postal item to a mail distribution center, remote from said distributing station, and delivering said franked postal item to a recipient identified by said shipping data via a second mail carrier.

9. A postal matter processing system comprising:

a receiving station having no security against monetary theft and a storage container into which a customer deposits a postal item to be shipped by a shipper requiring payment before shipping, and having a user interface operable by said customer to enter shipping data for said postal item into said receiving station and to arrange for payment for shipping said postal item at said receiving station, and having a printer which prints a machine-readable marking, not governmentally approved for franking, on said postal item representing said shipping data, to produce a marked but unfranked postal item which is temporarily stored in said storage container; and a distributing station, disposed remote from and unconnected to said receiving station, to which said marked postal item is transported from said receiving station, said distributing station having a franking apparatus and a memory accessible by said franking apparatus, said shipping data being transferred from said marking into said memory at said distributing station and being franked in said franking apparatus with a governmentally approved franking imprint dependent on said shipping data transferred from said marking and stored in said memory, to produce a franked postal item.

10. A postal matter processing system as claimed in claim 9 further comprising:

a first read/write unit at said receiver station;

a feeder at said receiver station having normally closed slot through which said postal item is deposited, said slot being opened upon insertion of a card by a customer into said first read/write unit;

a control unit connected to said feeder which allocates a unique number to each postal item and which is connected to said user interface to receive said shipping data therefrom;

a non-volatile memory at said receiving station, accessible by said control unit in which said control unit stores said shipping data allocated to said number, and said control unit controlling said printer to print said marking and said number on said postal item;

a carrier card having a carrier card memory, possessed by a mail carrier, said mail carrier inserting said carrier card into said first read/write unit and said control unit writing at least said number and said shipping data into said carrier card memory;

said storage container having a normally closed removal port, with opening of said removal port being enabled by insertion of said carrier card into said first read/write unit to allow removal of said marked postal item from said storage container;

a second read/write unit at said distributing station into which said carrier card is inserted to download said shipping data and said number from said carrier card memory into said memory at said distributing station;

a sensor and feeder stage at said distributing station to which said marked postal item is supplied and which senses said postal item to produce sensed data; and a postal calculating unit at said distributing station supplied with said shipping data and said scanned data and which calculates a cost of shipping said marked postal item from said scanned data and said shipping data and which supplies information representing said cost to said franking apparatus for printing said cost on said franked postal item.

11. A postal matter processing system as claimed in claim 9 wherein said feeder stage at said receiver station comprises a plurality of sensors for sensing a format, a thickness and a weight of said postal item to produce sensor data, said sensor data being supplied to said control unit; and said card of said customer being a value card and said control unit calculating a cost for shipping said postal item from said sensor data and said shipping data and debiting said value card in said first read/write unit by said cost.

12. A postal matter processing system as claimed in claim 10 wherein said card possessed by said customer contains a customer identification number which is read by said first read/write unit and said customer identification number is supplied to said control unit, said control unit including a clock/date module which identifies a time and date at which said postal item was deposited at said receiving station, and said control unit controlling said printer at said receiving station to print a customer receipt including said time and date and said customer identification number, and a customer account allocated to said customer identification number being debited after printing said marking and before said franking at said distributing station.

13. A postal matter processing system as claimed in claim 9 comprising:

a first read/write unit at said receiving station, and a control unit connected to said first read/write unit;

said storage container having a normally closed slot that is enabled to be opened upon insertion of a card by a customer into said first read/write unit, said card containing a customer identifier which uniquely identifies the customer;

said control unit assigning a unique number to each postal item deposited through said slot;

a non-volatile memory accessible by said control unit at said receiving station in which said shipping data, said number and said customer identifier are stored as accounting data;

a single printer at said receiving station, operated by said control unit, to print a customer receipt having said accounting data thereon and to print said marking including said accounting data;

said storage container having a normally closed removal port operated by said control unit to allow removal of said marked postal item from said storage container;

a carrier card having a carrier card memory, possessed by a mail carrier, which is insertable into said first read/write unit and which enables opening of said removal port by said control unit for removal of said marked postal item, said control unit loading said accounting data from said non-volatile memory into said carrier card memory;

a sensor and feeder stage at said distributing station to which said marked postal item is supplied after transport from said receiving station to said distributing station, said sensor and feeder stage including a scanner for scanning said machine-readable marking on said postal item;

a second read/write unit at said distributing station into which said carrier card is inserted, said accounting data being downloaded from said carrier card memory into said memory at said distributing station;

a control unit at said distributing unit connected to said second read/write unit and to said memory at said distributing station, said control unit calculating a cost for shipping said marked postal item from said accounting data and from said marking scanned by said sensor and feeder stage and controlling said franking apparatus to frank said postal item with said cost; and said control unit initiating a communication with a customer bank to debit a customer account at said customer bank identified by said customer identifier before enabling said franking apparatus to frank said postal item.

14. A postal matter processing system as claimed in claim 9 further comprising a solar powered energy source at said receiving station for powering at least said control unit.

15. A postal matter processing system as claimed in claim 9 wherein said franking apparatus comprises a rate memory containing postal rates for calculating a cost of shipping said marked postal item.

16. A postal matter processing system as claimed in claim 9 further comprising a postal calculating unit at said receiving station and a rate memory at said receiving station accessible by said postal calculating unit for calculating a cost of shipping said postal item dependent on said shipping data.

17. A postal matter processing system as claimed in claim 16 wherein said control unit at said receiver station is connected to a modem at said receiver station for reloading updated rates into said rate memory.

* * * * *